United States Patent
Wiley et al.

(10) Patent No.: US 8,095,606 B1
(45) Date of Patent: Jan. 10, 2012

(54) PROVISIONING USER EMAIL ACCOUNTS BASED ON INCOMING EMAILS

(75) Inventors: Jon Wiley, San Jose, CA (US); Gabriel Cohen, San Mateo, CA (US)

(73) Assignee: Google Inc., Mountain View, CA (US)

( * ) Notice: Subject to any disclaimer, the term of this patent is extended or adjusted under 35 U.S.C. 154(b) by 121 days.

(21) Appl. No.: 12/547,755

(22) Filed: Aug. 26, 2009

Related U.S. Application Data

(60) Provisional application No. 61/091,893, filed on Aug. 26, 2008.

(51) Int. Cl.
*G06F 15/173* (2006.01)

(52) U.S. Cl. ...................................................... 709/206

(58) Field of Classification Search .................. 709/206, 709/217, 220, 223
See application file for complete search history.

(56) References Cited

U.S. PATENT DOCUMENTS
6,487,278 B1 * 11/2002 Skladman et al. ......... 379/88.13
* cited by examiner

*Primary Examiner* — David Eng
(74) *Attorney, Agent, or Firm* — Shumaker & Sieffert, P.A.

(57) ABSTRACT

Methods and apparatus, including computer program products, for implementing and using techniques for provisioning a user email account. An email is received, which has an email address comprising a local part and an email address domain. It is determined that an email address account at the email address domain is not associated with the local part of the email address. In response to the determination, a user email account is provisioned in the email address domain based on the local part of the email address.

19 Claims, 4 Drawing Sheets

PROVISIONING USER EMAIL ACCOUNTS BASED ON INCOMING EMAILS

CROSS-REFERENCE TO RELATED APPLICATIONS

This application claims priority to U.S. Provisional Application No. 61/091,893, filed on Aug. 26, 2008, and entitled "Provisioning User Email Accounts based on Incoming Emails," the contents of which are incorporated here in their entirety.

BACKGROUND

The subject matter described herein relates to provisioning of email accounts for users. Electronic mail, or "email," is a common method of composing, sending, receiving, and storing messages over electronic communications systems. In order to send and receive email, a user has an email address that is associated with a physical storage space on a server, from which the user can send and retrieve email using an email client. This server space and associated email address is typically referred to as an email account. Many companies provide so called hosted solutions, in which the company sets up the account and provides the server space and the user can access the email account through an email client or a web-based interface. Emails typically have the format person@example.com, where "person" is the local part of the email address and "example.com" is the domain for the email address.

Provisioning of user email accounts, particularly in bulk, can be a very complex process, especially in a hosted environment where a very large number of accounts typically need to be provisioned. Conventionally, a computer system administrator determines what user accounts need to be created, and then manually creates an account for each user through an application programming interface (API). Alternatively, the administrator can upload a file with the parameters for all the user accounts that need to be created, and then specify various settings for the accounts using the API. This can be very time consuming and error prone, especially when migrating a large number of users from an old system to a new system.

SUMMARY

In general, in one aspect, the various embodiments provide methods and apparatus, including computer program products, for implementing and using techniques for provisioning a user email account. An email is received, which has an email address comprising a local part and an email address domain. It is determined that an email address account at the email address domain is not associated with the local part of the email address. In response to the determination, a user email account is provisioned in the email address domain based on the local part of the email address.

Some implementations can include one or more of the following features. The email can be sent by a computer system administrator of the email address domain or an email correspondence contact for an addressee of the email. The email address domain can be an email address domain in a hosted email system. The email can be redirected from a legacy email system, and it can be further verified whether the local part of the email address represents an existing user in the legacy email system; and a user email account can be provisioned in the email address domain based on the local part of the email address only if the local part of the email address represents an existing user in the legacy email system.

Provisioning the user email account can include provisioning the user email account based on instructions included in a body of the email. The email can be delivered to the newly provisioned user email account. A user can be notified about the provisioning of the user email account. User data can be transferred into the newly provisioned user email account from an existing, different user email account. The data can include an email contact list, configuration settings, archived emails, or email attachments, Various implementations can include one or more of the following advantages. User email accounts can be created based on incoming emails and with little or no intervention by a computer system administrator. No specific application programming interface for creating user email accounts is necessary. A set of user email accounts can be easily migrated from an old legacy system to a new hosted system. The accounts with the highest email traffic automatically receive the most attention during the migration without having to be specifically selected by an administrator. The old legacy email system does not have to be duplicated. Old email accounts in the legacy system that are no longer in use are automatically "cleaned up," as they will not be created on the new hosted system. The users and/or an administrator of the old legacy system or the new hosted email system, respectively, can be notified upon completion of the migration of emails to the new system.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

The various embodiments provide techniques of provisioning user email accounts, particularly in a hosted email setting. In accordance with one embodiment, the user email accounts are created based on incoming emails, with little or no further input from a computer system administrator.

Figure 1:
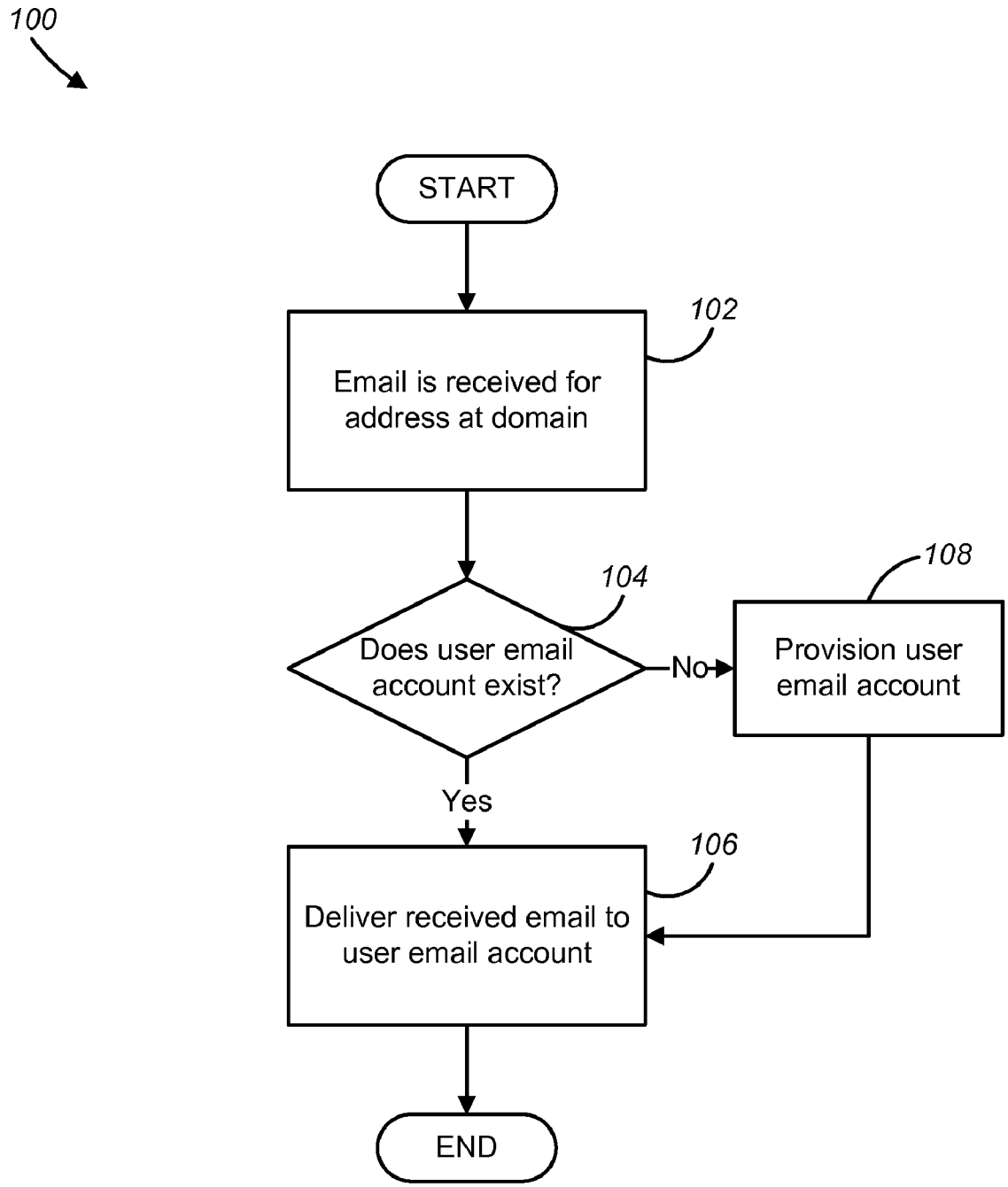
FIG. 1 shows a schematic overview of a process for creating a user email account in accordance with one embodiment.

FIG. 1 shows a schematic overview of a process (100) for creating a user email in a hosted email system account in accordance with one embodiment. It is assumed that the domain for the email address already exists, and that the domain uses a hosted mail routing and hosted email service. As can be seen in FIG. 1, the process starts when an email is received for an address at the domain (step 102). In this example, it is assumed that the domain is example.com and that the email is sent to person@example.com. The email can either be an incoming email from a regular contact, or the email can be a special "controller" email that could be sent by, for example, an administrator for the example.com domain, and perhaps be sent to everyone in the domain. The "controller" email can contain structured content in the body of the email that the hosted system is programmed to read, as will be discussed in further detail below.

Next, a mail router intercepts and examines the incoming email to determine whether a user email account already exists for person@example.com in the hosted system (step 104). This can be done, for example, through a mail transfer agent, the function of which is familiar to those of ordinary skill in the art. If a user email account exists, the email is delivered to the appropriate user email account (step 106) and the process ends.

If it is determined in step 104 that a user email account does not exist, an appropriate user email account is provisioned (step 108). In some embodiments, additional checks are performed prior to provisioning the account. For example, it can be examined whether the email address is a legitimate target, that is, whether an email exists for the person in an old legacy system. In some embodiments, an administrator can disallow provisioning of new accounts that do not exist in the legacy system. This may reduce the possibility for spam emails that automatically might create large numbers of email accounts.

Optionally, the email can contain instructions about how the provisioning should be done. This can be the case, for example, with a controller email, as described above. In some embodiments, the users can be sent a link to an online form, where they can enter personal data that is pertinent to the account creation process. The online form can then, upon completion by the user, send out an email that triggers the provision of the new account on the hosted system, as described herein. Once the provisioning is done, the email is delivered to the newly provisioned user email account on the hosted system (step 106) and the process ends.

Optionally, other actions may also be taken, such as notifying the domain administrator or forwarding the email to yet another system, etc., as can be realized by those of ordinary skill in the art. In some embodiments, the users in the old legacy system can also be notified upon completion of the migration, for example, with an email containing login credentials to the new accounts on the hosted email system and a notification that they will no longer receive emails at their old email address.

The provisioning of user email accounts described above with reference to FIG. 1 may be useful in migrating large numbers of users from an existing ("legacy") email system to a different email system, such as a hosted email service. If given email addresses in the legacy system have a history and are currently receiving emails, this method could be used to migrate users to the new hosted email service without first having to provision the user accounts. For instance, if a domain with a legacy email system were to activate hosted mail routing and specify that incoming emails should be delivered to both the legacy system and the new hosted service (i.e., coexistence), emails could begin flowing into the new hosted system without any further action on the part of the domain administrator. This is in contrast to conventional systems, in which emails to the new hosted system would fail to be delivered since there would be no user accounts to receive them. In some embodiments, the new hosted system discovers that the account does not exist, creates the account, and delivers the message to the newly created user account, possibly with other actions taken as a result of instructions from the domain administrator. This can be thought of as "just-in-time account provisioning."

Figure 2:
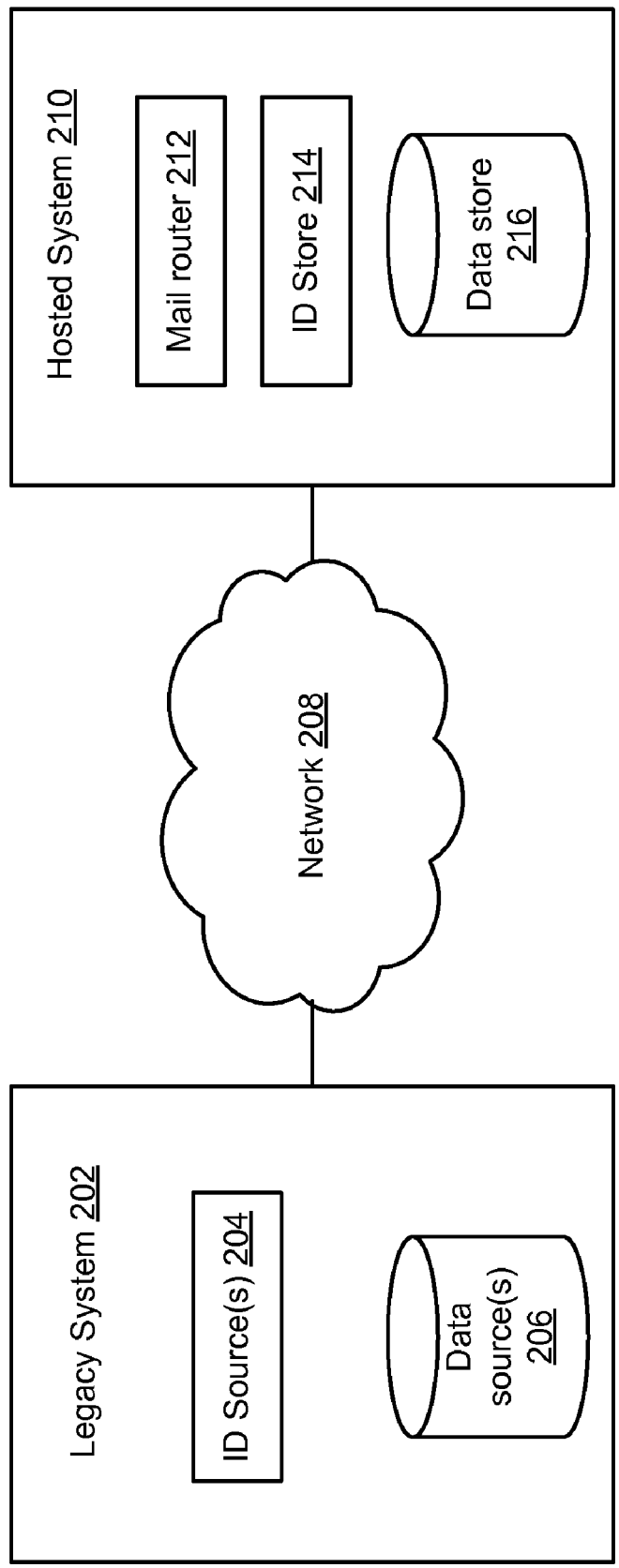
FIG. 2 shows a schematic overview of a system for migrating a set of users from a legacy email system to a hosted email system in accordance with one embodiment.
Figure 3:
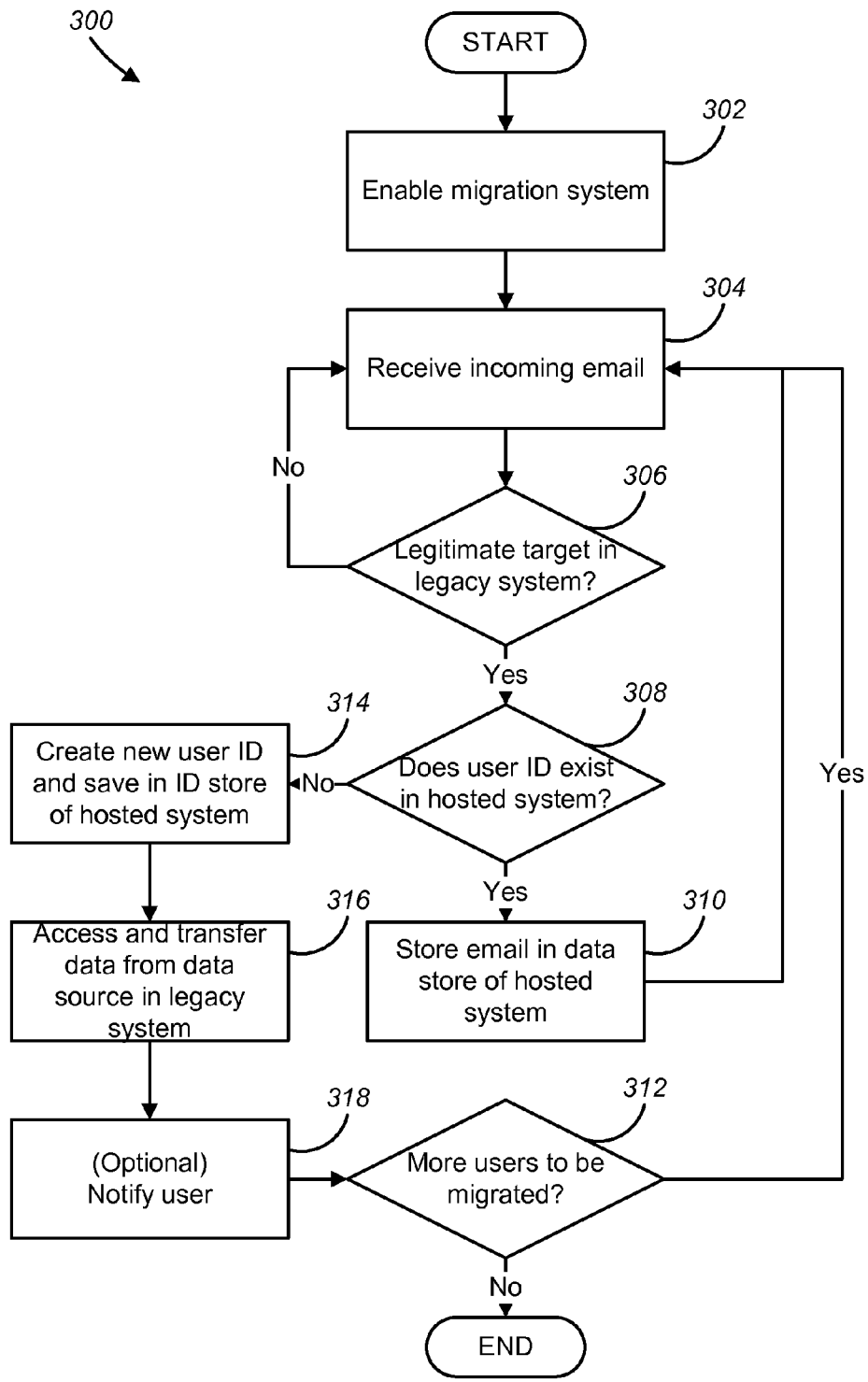
FIG. 3 shows a schematic process used in the system of FIG. 2 for migrating the users from the legacy email system to the hosted email system in accordance with one embodiment.

FIGS. 2 and 3 show a schematic overview of a system (200) for migrating a set of users from a legacy email system to a hosted email system, and a process (300) for how the migration can be performed in accordance with one embodiment.

As shown in FIG. 2, the system (200) includes an old legacy email system (202) that contains identities of a number of email users, represented by an ID Source (204), and actual data that is associated with each user, represented by a data source (206). The data source (206) can contain data that is associated with the user's email account, such as individual configuration settings, address books, emails, attachments, etc. for each user. In this example, the user identities and data stored in the legacy system (202) are migrated over a network (208), such as the Internet, for example, to a hosted email system (210). The hosted email system includes a mail router (212) for examining incoming emails, as described above, a user identity store (214) that stores the user identities, and a data store (216) that stores the data associated with each user, similar to the data source (206) in the legacy email system (202).

FIG. 3 shows a process (300) for migrating a set of users from the legacy email system (202) to the hosted email system (210). As can be seen in FIG. 3, the process (300) starts by enabling the migration system (step 302), for example, by receiving an input from a system administrator for the legacy system (202) or the hosted system (210) signaling that the migration should be started. The input can, for example, be an instruction to the legacy system (202) to forward a copy of all incoming emails to the hosted system (210). Next, an email is received by the mail router (212) of the hosted system (210) (step 304). The process checks whether the incoming email is addressed to a legitimate target address in the legacy system (step 306). This check can be accomplished, for example, by verifying using some kind of administrator key for the legacy system (202), that the email address actually exists in the ID source (204) of the legacy system (202). This check may prevent creation of new email accounts, if the incoming email is a so called "spam" email that is sent to a random address that does not exist in the legacy system (202).

If it is determined in step 306 that the email address does indeed exist in the legacy system (202), the process checks whether the user account to which the email is directed has already been created in the hosted email system (210) (step 308). If the user account exists in the hosted email system (210), then the email is stored in the data store (216) of the hosted system (210) and is associated with the user account (step 310). This concludes the processing of the incoming email, and the process returns to step 304 where a new email is received, as described above.

If it is determined in step 308 that the user account does not exist in the hosted email system (210), then a new user account is created and saved in the ID store (204) of the hosted system (210), as was described above with reference to FIG. 1 (step 314). Now that the user account has been created in the hosted email system (210), the process can access the user's data from the data source (206) in the legacy system (202), typically using an administrator's key to gain access to the data, and transfer the data over the network (208) to the data store (216) of the hosted email system (210) (step 316).

After the data has been transferred, the user can optionally be notified in the legacy system (202) that his data has been transferred (step 318). The user is typically also given instructions of how to access the data in the new hosted system (210), typically through a login ID and a password, etc. This step can also be deferred, alternatively, until all users have been migrated onto the new hosted system (210), at which point a general notification can be sent out.

Finally, after notifying the user, the process checks whether there are any more users to be migrated or whether all the user accounts corresponding to the user accounts in the legacy system (202) have been transferred to the hosted system (210) (step 312). If there are still users that need to be migrated, the process returns to step 304, where a new email is received, as described above. If there are no more users to be migrated, then the process ends.

The mechanisms for doing the actual data transfer between the legacy system and the host system can take a variety of forms, as can be realized by those of ordinary skill in the art. For example, the hosted system can fetch data from the legacy system, using POP (Post Office Protocol) operations, or the legacy system can actively send data to the hosted system using so-called PUSH operations, both of which are well familiar to those of ordinary skill in the art. In some embodiments, there can be an intermediate system between the legacy system and the hosted system that is capable of instructing the legacy system to send data to the hosted system, for example, in response to a request from the hosted system. In this configuration, the hosted system does not need to know the details about the legacy system, but can just send a simple request to the intermediary system, and the intermediary system knows where and how to obtain the requested data.

As was noted above, spam emails could potentially be a concern if an "uncritical" account creation took place in the hosted system (210) for each incoming email and without any further checks. In order to minimize this potential problem, there are a number of measures that can be taken. For example, in the embodiment described above, the process checks whether the incoming email is addressed to a legitimate target address in the legacy system. Other parameters can also be set, for example, to provision the account in the hosted email system (210) only if the email comes from a particular sender (or a specified set of senders), or if the email contains specific information or codes, if the recipient has ever received emails from the sender before, etc. Specific threshold values for various parameters can be set for the purpose of determining the legitimacy of the email, as can be envisioned by those of ordinary skill in the art.

It should be noted that the above example is an example of a "viral" migration of users from a legacy system to a hosted system, where new user identities are created gradually as emails come in. This automatically results in the most "active" email accounts getting the most attention. However, the process can also be triggered by a user emailing all the user identities of the users in the legacy system to the hosted email system, and then all the accounts can be created prior to actually transferring any data from the data source in the legacy system. It should also be noted that the data that is transferred can include not only emails per se, but also user account setting, spam filter settings, saved attachments, address books, etc.

Figure 4:
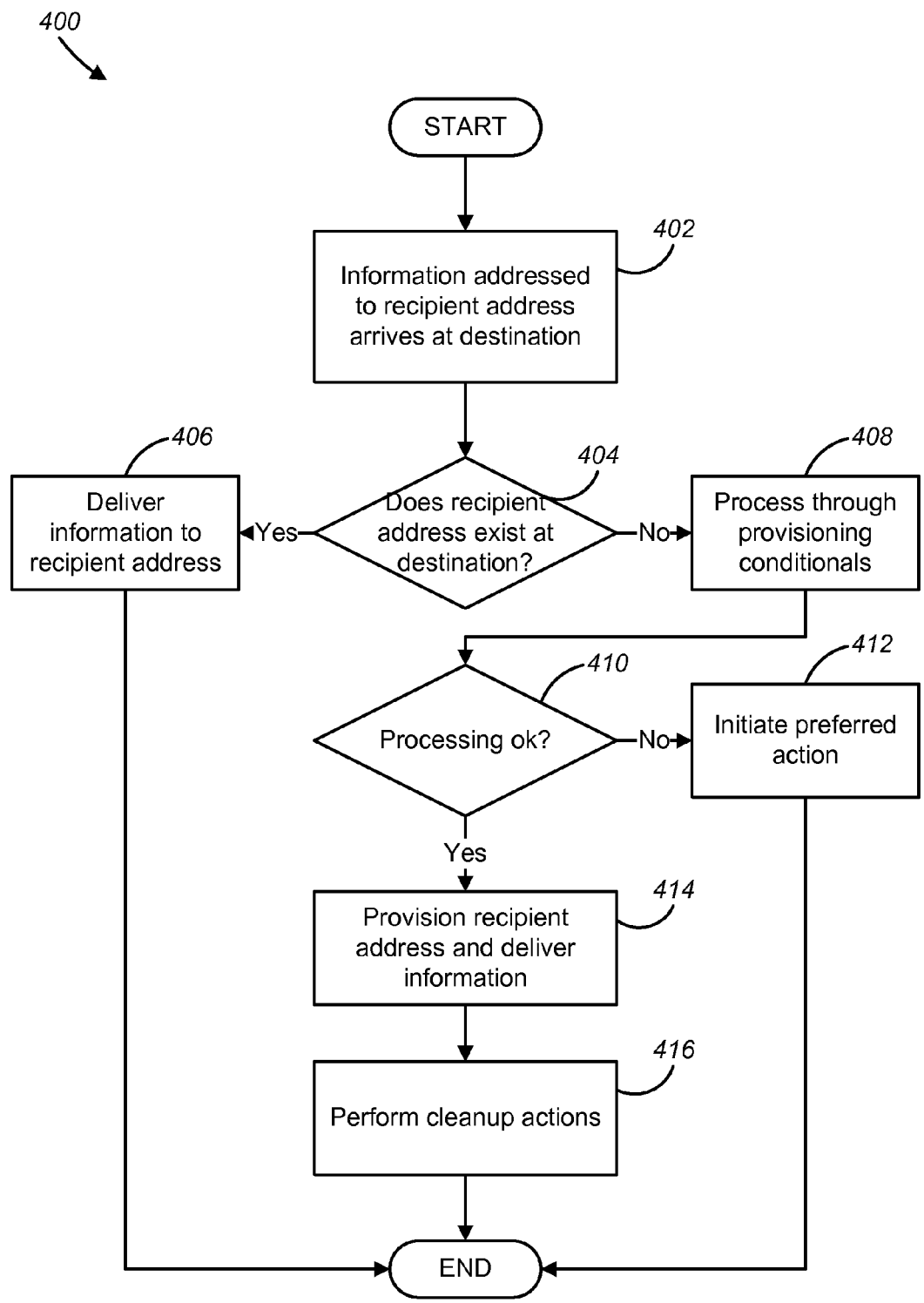
FIG. 4 shows a schematic process used in a system similar to the system of FIG. 2 for migrating information associated with the users from the legacy system to a hosted system in accordance with one embodiment.

The systems and process described above can also be generalized to migrating general information or content associated with one or more users, such as photo albums, documents and/or various types of data files, chat records, etc. FIG. 4 shows a schematic process (400) for performing such a migration, from a legacy system to a hosted system, similar to the system of FIG. 2. It is assumed that the information is associated with some kind of metadata, such as a "destination" or a "recipient."

As can be seen in FIG. 4, the process (400) starts by information addressed to a recipient address arriving at the destination (step 402), such as the hosted system. The system then checks whether the recipient address exists at the destination (step 404). If the recipient address exists, the information is delivered to the recipient address (step 406), and the process (400) ends.

If it is determined in step 404 that the recipient address does not exist, the information is processed through a set of conditionals (step 408). These conditionals can include, for example, spam control processing, as described above, and/or various other conditions, such as no user account should be provisioned unless a certain number of information pieces has been received from trusted senders, etc., similar to what was described above. The process then determines whether the provisioning conditionals were successfully processed (step 410). If the processing was successful, the recipient address is provisioned and the information is delivered (step 414), and a set of "cleanup actions" is performed (step 416). The cleanup actions in step 416 can include, for example, closing down a legacy account where the information was originally stored, notifying users, etc., similar to what has been described above.

If it is determined in step 410 that the conditional processing of step 408 was not successful, then one or more preferred actions are initiated (step 412). These actions may be, for example, not to provision any account, and send some kind of error message to the originator, notify an administrator, etc., which completes the process (400).

Various embodiments can be implemented in digital electronic circuitry, or in computer hardware, firmware, software, or in combinations of them. Apparatus can be implemented in a computer program product tangibly embodied in a machine-readable storage device for execution by a programmable processor; and method steps can be performed by a programmable processor executing a program of instructions to perform functions by operating on input data and generating output. Various embodiments can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the various embodiments can be implemented on a computer system having a display device such as a monitor or LCD screen for displaying information to the user. The user can provide input to the computer system through various input devices such as a keyboard and a pointing device, such as a mouse, a trackball, a microphone, a touch-sensitive display, a transducer card reader, a magnetic or paper tape reader, a tablet, a stylus, a voice or handwriting recognizer, or any other well-known input device such as, of course, other computers. The computer system can be programmed to provide a graphical user interface through which computer programs interact with users.

Finally, the processor optionally can be coupled to a computer or telecommunications network, for example, an Internet network, or an intranet network, using a network connection, through which the processor can receive information from the network, or might output information to the network in the course of performing the above-described method steps. Such information, which is often represented as a sequence of instructions to be executed using the processor, may be received from and outputted to the network, for example, in the form of a computer data signal embodied in a carrier wave. The above-described devices and materials will be familiar to those of skill in the computer hardware and software arts.

It should be noted that the various embodiments employ various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part are useful machine operations. The manipulations performed are often referred to in terms, such as, producing, identifying, running, determining, comparing, executing, downloading, or detecting.

A number of implementations have been described. Nevertheless, it will be understood that various modifications may be made. For example, while the above implementations have been primarily described by way of example with respect to email, the same concepts can be analogously applied to telephone numbers and voice mails. In such a situation, the email address would correspond to a particular telephone number, and the data associated with the telephone number would be subscriber information, voicemails, call forwarding settings, etc. Accordingly, other embodiments are within the scope of the following claims.

The invention claimed is:

1. A computer-implemented method for provisioning a user email account, the method comprising:
   receiving an email from a legacy email system having an email address comprising a local part and a domain part associated with an email address domain;
   determining that there is no existing email address account at the email address domain associated with the local part of the email address; and
   in response to the determination, provisioning a user email account in the email address domain based on the local part of the email address, wherein provisioning the user email account comprises creating the user email account having the local part and the domain part of the email address.

2. The method of claim 1, wherein the email is sent by one of: a computer system administrator of the email address domain, and an email correspondence contact for an addressee of the email.

3. The method of claim 1, wherein the email address domain is in a hosted email system.

4. The method of claim 1, further comprising:
   verifying whether the local part of the email address represents an existing user in the legacy email system; and
   provisioning the user email account in the email address domain based on the local part of the email address only if the local part of the email address represents an existing user in the legacy email system.

5. The method of claim 1, wherein provisioning the user email account includes:
   provisioning the user email account based on instructions included in a body of the email.

6. The method of claim 1, further comprising:
   delivering the email to the user email account.

7. The method of claim 1, further comprising:
   notifying a user about the provisioning of the user email account.

8. The method of claim 1, further comprising:
   transferring user data into the user email account from an existing, different user email account at the legacy email system.

9. The method of claim 8, wherein the data includes one or more of: an email contact list, configuration settings, archived emails, and email attachments.

10. A computer program product, stored on a machine-readable medium, for provisioning a user email account, comprising instructions operable to cause a computer to:
    receive an email from a legacy email system, wherein the email has an email address comprising a local part and a domain part associated with an email address domain;
    determine that there is no existing email address account at the email address domain associated with the local part of the email address; and
    in response to the determination, provision a user email account in the email address domain based on the local part of the email address, wherein provisioning the user email account comprises creating the user email account having the local part and the domain part of the email address.

11. The computer program product of claim 10, wherein the email is sent by one of: a computer system administrator of the email address domain, and an email correspondence contact for an addressee of the email.

12. The computer program product of claim 10, wherein the email address domain is in a hosted email system.

13. The computer program product of claim 10, further comprising instructions to:
    verify whether the local part of the email address represents an existing user in the legacy email system; and
    provision the user email account in the email address domain based on the local part of the email address only if the local part of the email address represents an existing user in the legacy email system.

14. The computer program product of claim 10, wherein the instructions to provision the user email account includes instructions to:
    provision the user email account based on instructions included in a body of the email.

15. The computer program product of claim 10, further comprising instructions to:
    deliver the email to the user email account.

16. The computer program product of claim 10, further comprising instructions to:
    notify a user about the provisioning of the user email account.

17. The computer program product of claim 10, further comprising instructions to:
    transfer user data into the user email account from an existing, different user email account at the legacy email system.

18. The computer program product of claim 17, wherein the data includes one or more of: an email contact list, configuration settings, archived emails, and email attachments.

19. A system for provisioning a user email account, comprising:

a processor; and a computer-readable storage medium having stored thereon instructions that, when executed, cause the processor to:

receive an email from a legacy email system having an email address comprising a local part and a domain part associated with an email address domain;

determine that there is no existing email address account at the email address domain is not associated with the local part of the email address;

provision a user email account in the email address domain based on the local part of the email address, wherein provisioning the user email account comprises creating the user email account having the local part and the domain part of the email address.

* * * * *